April 24, 1962      G. M. GALIK      3,030,890
MEANS FOR CONTROLLING ELECTRIC PUMPS
Filed July 16, 1959
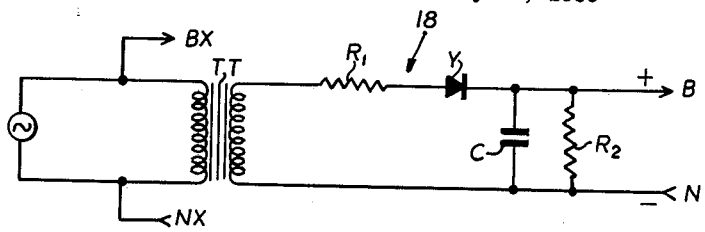
FIG. 1.
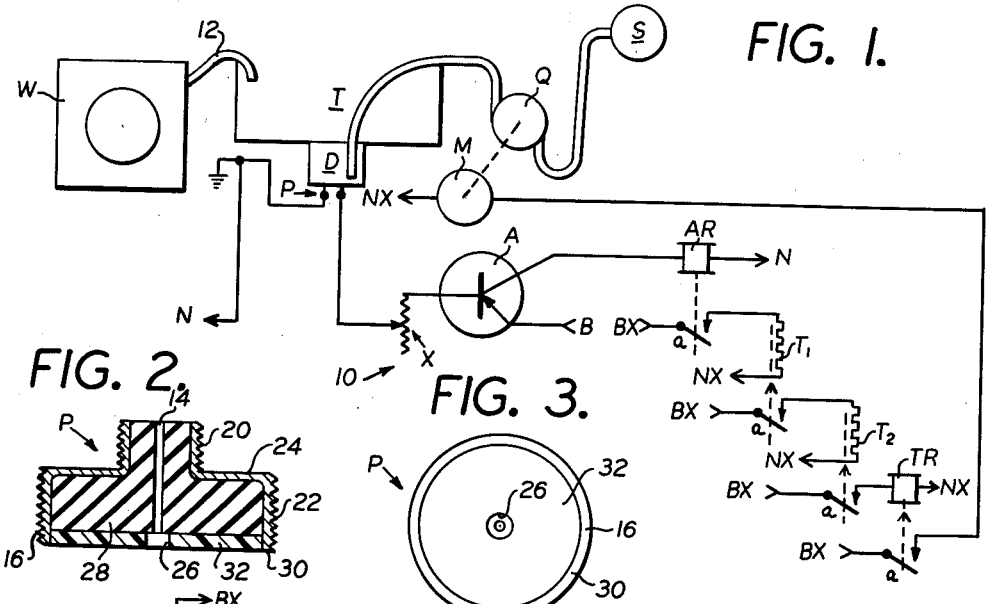
FIG. 2.     FIG. 3.
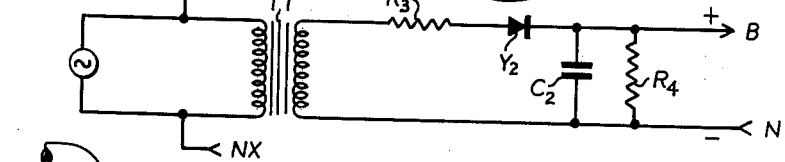
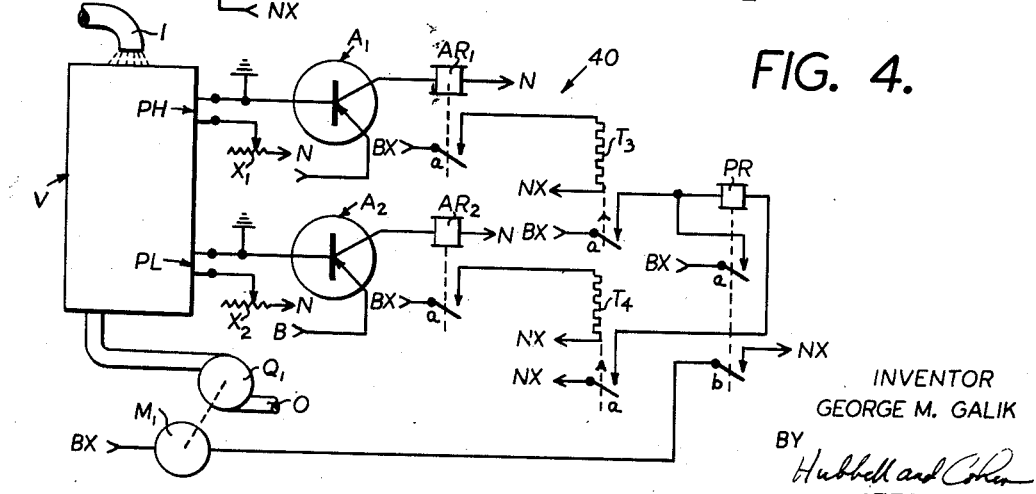
FIG. 4.
INVENTOR
GEORGE M. GALIK
BY
Hubbell and Cohen
ATTORNEYS.

United States Patent Office 3,030,890
Patented Apr. 24, 1962

3,030,890
MEANS FOR CONTROLLING ELECTRIC PUMPS
George M. Galik, 19 Porach St., Yonkers, N.Y.
Filed July 16, 1959, Ser. No. 827,545
6 Claims. (Cl. 103—25)

This invention relates to a means for controlling electric pumps and particularly to means for controlling electric motor driven pumps in response to the presence or absence of water.

There are many instances where it is necessary to remove water by pumping wherein the water is only intermittently present in the area from which it is to be removed. One example of this is in the cellar of a house having a home laundry machine wherein the sewer line servicing the house is at a level above the floor of the house. Hence, in order to remove the water ejected from the washing machine it is necessary to pump it up into the sewer. Another example of a situation of this type is in the bilge of a ship. In either instance in the past pumps have been actuated to remove water by float valves, or by pressure switches or by probes including spaced electrodes between which current is conducted by the water.

Float switches have the disadvantage of only operating when the water to be removed achieves a certain level. If some water enters a container such as a sump or a tub but not enough water enters to close the float switch then the water lies there to stagnate which causes a serious health hazard. Furthermore, as float switches include considerable linkage which is at times immersed in the water they can become clogged with lint, dirt or soap scum, and hence be rendered inoperative.

Pressure switches are generally placed at the bottom of a sump, tank or tub and only close to actuate the pump when a certain weight of water overlies the switch. If less than the predetermined weight of water overlies the switch the switch will not close to actuate the pump. Hence the water will collect and stagnate. In order to overcome this difficulty efforts have been made in the past to render the pressure switches extremely sensitive. However, if this is done then the pressure switch becomes extremely expensive and tends to open and close very rapidly if water is coming into the tub in spurts as during the spin dry of a washing machine to thus rapidly energize and deenergize the pump motor to cause serious surges through the motor and across the contacts of the pressure switch. These surges have extreme deleterious effects on the electrical equipment and hence lead to severe maintenance problems.

If a probe is used generally the conductivity of the water is so low that high voltages must be employed between the probe electrodes. Naturally, if high voltages are employed there is a serious safety problem. Furthermore with probes when water is introduced in spurts there tends to be rapid intermittent energizing and deenergizing of a highly sensitive relay which leads to a pitting of contacts, burning out of pump motors, etc. Moreover, since, even with high voltages, the current levels are relatively low, the relay which is energized across the probe electrodes must be extremely sensitive and such relays are invariably expensive.

The present invention is directed to means for overcoming the shortcomings in existing water detection systems. In the present invention a probe having spaced electrodes is employed to detect the presence and absence of water. However, relatively low voltages may be employed as the current flowing between the electrodes of the probe is amplified before being supplied to a repeater relay. Hence, relatively small currents can be multiplied a large number of times by an amplifier and fed to a relatively insensitive relay which will open and close in accordance with the presence and absence of water. Furthermore, in accordance with the present invention, means are provided to prevent the operation of the pump motor for a period of time after water begins to conduct electricity between the probe electrodes to prevent chattering and quick on-off of the pump motor and thus obviate deleterious effects resulting from this phenomenon.

The main object of the present invention is the provision of a new and improved apparatus for operating a pump in response to the presence of or absence of water.

Another object of the present invention is the provision of a new and improved apparatus for removing water from a tank when the water is preesnt.

Still another object of the present invention is the provision of a new and improved probe for detecting the presence or absence of water.

Yet a further object of the present invention is the provision of means for actuating a pump motor in accordance with the presence or absence of water, which means is relatively inexpensive to manufacture and maintain.

Still a further object of the present invention is the provision of a new and improved means for maintaining the level of water in a container between predetermined limits.

The above and other objects, characteristics and features of the present invention will be more fully understood from the following description taken in connection with the accompanying illustrative drawings.

In the drawing:

FIG. 1 is a diagrammatic representation of apparatus and associated electrical circuitry for removing water from a tub;

FIG. 2 is a vertical sectional view of a probe embodying the present invention;

FIG. 3 is a front view of the probe shown in FIG. 2; and

FIG. 4 is a diagrammatic view of apparatus and associated circuitry for maintaining the level of water in a tank between predetermined limits.

Referring now to FIG. 1 in detail, the apparatus for controlling the level of water in a tub T is generally represented by the reference character 10. As shown herein by way of illustration the water in the tub T is supplied to it from a washing machine W through a pipe 12 which conveys water from the washing machine to the tub. The level of the bottom of the tub T is below the level of a sewer line S. Accordingly, tub T cannot have a conventional gravity drain. However, as tub T may be a standard washing tub it will have a plugged drain D. The drain D may be of any standard plumbing design, and herein is shown as having a bottom outlet which is plugged by the probe P which will be described in greater detail hereinafter.

To remove the water from the tub T and convey it into the sewer line S a pump Q having a pump motor M is employed. As will be explained in greater detail hereinafter the pump motor M is energized and deenergized in accordance with the presence or absence of water in the tub T. The pump motor M is controlled by a power relay TR which in turn is controlled by a time delay means here shown as cascade connected thermal relays T1 and T2. The time delay means is in turn controlled by an amplifier repeater relay AR which is energized by an amplifier A here shown as a transistor, although other non-linear amplifying means may be employed. The input to the transistor is proportional to the current flowing between the electrodes 14 and 16 of the probe P.

Energy for the control apparatus 10 is supplied from a power supply 18 the input of which is standard 60 cycle house current. A portion of the apparatus is energized directly from the house service through the terminals BX and NX of the A.C. supply. The power supply also has integrated therewith a D.C. supply having a positive terminal B and a negative terminal N. As shown herein the D.C. supply includes a step down transformer TT, a current limiting resistor R1, a rectifier Y, a filtering condenser C and a biasing resistor R2. The rectifier Y may be either a solid state device or a tube diode as may be preferred.

The probe P is shown in detail in FIGS. 2 and 3. As shown therein the probe P includes an outer casing having a longitudinally threaded portion 20 of relatively small diameter, a longitudinally threaded portion 22 of relatively large diameter, the portions 20 and 22 being connected by a horizontal disc 24. The outer casing 16 can be made of a single casting and this is presently preferred. The material for casing 16 may be brass, copper or other good electrical conducting material. Extending through the center of the probe P is the electrode 14 having a slightly enlarged forward portion 26 although this is not necessary. To hold the electrode 14 in spaced relation to the electrode 16 a suitable insulating material 28 fills substantially the entire void between the two electrodes. Any suitable insulator may be employed and preferably a plastic material such as an epoxy. However, the insulator 28 does not extend all the way to the front surface 30 of the probe P but, instead, terminates a short distance away from said front surface. To make the front surface of the insulator flush with the front surfaces of the electrodes 14 and 16, a disc 32 of a non-wettable insulating material is inserted into the probe P to overlie the insulating material 28 and to make the front surface of the probe P flush. Preferably this insulator 32 is made of a material such as polytetrafluoroethylene or polytrifluorochloroethylene. The inclusion of a non-wetting insulator at the front surface of the probe P prevents the conduction of electricity between the electrodes 14 and 16 by surface water adhering to the insulating material.

Preferably the diameter of the wide portion 22 of electrode 16 is equal to the standard threaded opening in a drain pipe D so that the probe can be threadedly connected to the drain pipe D to be in conducting relation with water in the tub T. However, the diameter of the narrow diameter portion 20 of the probe P is preferably equal to a standard connector diameter so that a standard connector can be threadedly connected to the probe P in order to connect the probe P to the associated electrical apparatus.

As shown herein one terminal of the probe P is connected to the base of the transistor amplifier A through a potentiometer X. The other terminal of the probe P is connected to the negative terminal N of the D.C. supply, and preferably is also grounded. With the negative terminal N grounded there will be no floating voltages and hence no potential hazard from utilizing this system. If probe P is of the design shown in FIGS. 2 and 3, electrode 16 may be conveniently grounded through the tub T itself. The emitter of the transistor is connected to the positive terminal B of the D.C. supply and the collector of the transistor is connected to one terminal of the amplification repeater relay AR, the other terminal of which is connected to the terminal N. Hence, it will be seen that when no water is present in the tub T there will be no conduction between the electrodes 14 and 16 of the probe P. With no current flowing therebetween the output of the amplifier A will be zero and the relay AR will be deenergized and released to thus open its front contact $a$. The front contact $a$ of relay AR controls the thermal relay T1 which is a relatively slow acting relay having a delay time of approximately 5 to 8 seconds. The front contact $a$ of the thermal relay T1 controls a relatively quick acting thermal relay T2 which has a time delay of the order of one second. The front contact $a$ of thermal relay T2 controls the energization of the power relay TR which, as stated hereinbefore, controls the energizing circuit for the motor M. Accordingly, with no water in the tub all of the contacts of the various relays will be open and the motor M will be deenergized to cause the pump Q to be deactivated.

Let it now be assumed that water is pumped out of the washer W through the pipe 12 and into the tub T. Let it be further assumed that this is a continuous stream of water. As soon as the water enters the tub T it will cause conduction between the electrodes 14 and 16 of the probe P and thus cause current to flow through the base circuit of the transistor amplifier A. This current will be amplified by the amplifier A and thence will cause sufficient current to flow from the amplifier A through the winding of the relay AR to energize the relay and cause it to pick up to close its front contact $a$. As soon as the relay AR picks up current will flow from terminal BX over front contact $a$ of relay AR, through the heating element of thermal relay T1 to the terminal NX. As the heating element heats up, the bimetal in the relay T1 (not shown) will move the contact $a$ towards its closing position and the front contact $a$ will close at the expiration of the predetermined delay time. During this delay time water continues to accumulate in tub T. Upon the closing of the front contact $a$ of relay T1 current will be supplied to the heating element of relay T2 over the circuit including the terminal BX, the front contact $a$ of relay T1, the heating element of relay T2 to the terminal NX. Accordingly, the heating element of relay T2 will commence generating heat to cause the bimetal (not shown) in relay T2 to move front contact $a$ towards its closed position. This will be a relatively quick movement as the delay time of relay T2 is slight. Upon front contact $a$ of relay T2 closing energy will be supplied to relay TR over the circuit which may be traced from terminal BX over front contact $a$ of relay T2 and the winding of relay TR to terminal NX. It will be noted that during this second time delay interval water will continue flowing into the tub T. Upon relay TR becoming energized it will pick up and close its front contact $a$ to thereby close the energizing circuit for motor M which circuit may be traced from terminal BX over front contact $a$ of relay TR and the motor M to terminal NX. With motor M energized pump Q will commence pumping water out of the tub T to the sewer line S and will continue doing this as long as water is present in the tub T. As soon as the water has been removed from the tub T current will cease to flow across the electrodes of probe P and hence amplifier A will cease putting out energy for relay AR. Hence, relay AR will release and deenergize relay T1 which will open its front contact $a$ to thus deenergize relay T2 and open its front contact $a$. With front contact $a$ of relay T2 opened relay TR will become energized to open the energizing circuit for the motor M at front contact $a$ of relay TR and thus deenergize the motor M. Hence, the pump Q will cease operating.

In the above description where water was being fed in a steady stream into tub T the importance of the several features of the present invention are not as clearly pointed out as they will be when it is assumed that water is pumped from the washer W into the tub T in short intermittent spurts as during a spin drying operation. In such a case if the time delay means incorporated in the circuit shown in FIG. 1 were not included, each time a spurt of water was introduced into the tub T the motor M would become energized to remove that water and as soon as the water was removed the motor would be deenergized. Accordingly, if the water came in in rapid spurts the contacts of the power relay TR would chatter and the motor M would rapidly fluctuate between its energized and deenergized conditions, thus subjecting the contacts of relay TR to severe arcing and the motor M to repeated heavy current surges and mechanical strains. However, this is prevented by the inclusion of the time delay means herein shown by the thermal relays T1 and T2.

Assuming water is being introduced in short spurts upon the first spurt of water being introduced current will flow between the electrodes of the probe P to actuate the amplifier A and thereby energize the relay AR. However, upon the relay AR picking up motor M will remain deenergized as a substantial time must elapse before the time delay operates to close the energizing circuit for motor M. Accordingly, during the time delay resulting from the action of the thermal relays T1 and T2, a substantial number of spurts of water will be introduced into the tub T without the motor M becoming energized. After the expiration of the two time intervals, motor M will become energized to cause pump Q to remove the accumulated water at which time the apparatus will become deenergized. Upon deenergization of the apparatus an additional number of spurts of water will be accumulated before the apparatus reenergizes the motor M. Accordingly, once the motor M is deenergized it cannot be reenergized until the expiration of a predetermined time interval equal to the closing times of the relays T1 and T2. Thus, the rapid fluctuation of the motor betwen its energized and deenergized conditions together with the concomitant chattering of relay TR is eliminated to thus reduce a great maintenance problem. Furthermore, as long as there is water in the tub T the apparatus will eventually be activated to cause the removal of that water. No water can possibly lie in the bottom of the drain D without activating the pump for more than the time delay interval equal to the sum of the intervals of relays T1 and T2. Hence, the problem of stagnation of a water residue is eliminated.

As shown herein the time delay is effected by two cascade connected thermal relays, a slow closing thermal relay T1 and a quick closing thermal relay T2. This construction is preferred due to the fact that thermal relays are relatively inexpensive. Further, the use of the cascade connected slow closing and quick closing relays is preferred as it reduces the tendency of severe pitting of the contacts due to arcing. As the only apparatus which is directly controlled by the thermal relay T1 is the heating element of the relay T2, which heating element draws very little current, as contact a of relay T1 approaches its closed condition there will be relatively arcing when the contact becomes almost closed. The interposition of the relay T2 in the circuitry is to isolate the slow closing contact a from the relatively large demands of relay TR which demands are supplied over front contact a of relay T2. However, since relay T2 closes relatively quickly the period of arcing will be extremely limited in time to thus reduce pitting of the contact a of relay T2. In lieu of this inexpensive time delay means a clock actuated mechanism having snap closing contacts may be substituted for the relays T1 and T2 or a normal relay with a large snubbing capacitor may be employed. Ultimately what is desired is a time delay together with a final quick closing of the contacts for energizing the power relay TR and any suitable means can be employed for this purpose.

The above description of my novel apparatus was in conjunction with the removal of water from a tub in the cellar of a house having a "hanging" sewer. It will be understood that this description is merely illustrative and that the control apparatus can be effectively used in many other applications such as to control bilge pumps, sump pumps, irrigation system pumps, etc.

Referring now to FIG. 4, an apparatus 40 for controlling the level of water in a vessel V is illustrated. This apparatus includes a low level probe PL and a high level probe PH both probes preferably being identical in construction to the probe P in FIGS. 2 and 3. The low level probe is located at the lowest level to which it is desired to permit the liquid to drop and the high level probe PH is located at the highest level to which it is desired to let the liquid rise in the vessel. Associated with the high level probe PH is an amplifier A1 which is preferably a transistor. The amplifier A1 controls the energization of a repeater relay AR1 which is turn controls the energization of a thermal relay T3. The low level probe PL is connected into the base circuit of an amplifier A2, preferably a transistor, which controls the energization of a relay AR2. Relay AR2 in turn controls the energization of a time delay relay here shown as a thermal relay T4. The relays T3 and T4 jointly control a power relay PR which controls the energization of a pump motor M1 for a pump Q1. The pump Q1 as will be described hereinafter is designed to pump liquid out of the vessel V when the liquid reaches the level PH and to discontinue the pumping operation when the liquid reaches the lower level PL. The liquid is introduced into the vessel by any suitable inlet pipe I.

Specifically, the upper probe PH energizes the amplifier A1 through a circuit including a potentiometer X1 when liquid is at the level of the probe PH to permit current to flow between the two electrodes of the probe. Amplifier A1 will put out energy to cause relay AR1 to pick up and thus energize relay T3. When relay T3 has been energized for a predetermined time interval contact a of relay T3 will close.

The low level probe PL supplies energy to the amplifier A2 in precisely the same manner as the high level probe PH supplies energy to amplifier A1. Amplifier A2 when supplied with current through the probe PL will energize the relay AR2 to cause that relay to pick up and energize time delay relay T4. When the time delay interval has expired front contact a of relay T4 will close.

Let it be assumed that the water is just below the probe PL in which event no current is flowing between the electrodes of either probe PL or PH. Accordingly, amplifiers A1 and A2 will not be putting out any energy. Hence, relays AR1 and AR2 will both be deenergized to cause their associated time delay relays T3 and T4 to be deenergized. With the relays T3 and T4 deenergized the power relay PR will be deenergized. Thus the pump motor M1 will be deenergized to render the pump inoperative. With the pump Q1 not operating water flowing through inlet I will cause the level of the water in the vessel V to rise and it will first rise over the electrodes of the probe PL to cause current to flow therebetween. Accordingly, amplifier A2 will commence to put out energy to energize relay AR2 to thus cause relay AR2 to pick up and close its front contact a. With the front contact a of relay AR2 energized the heating element of thermal relay T4 will become energized and after a time delay will cause front contact a of relay T4 to close. However, closing of front contact a of relay T4 will not close any energizing circuit for relay PR and hence relay PR will remain deenergized to maintain the pump motor M1 and pump Q1 deenergized. Hence, the water level in the vessel V will continue to rise due to the influx of additional water through the inlet I. Upon the water reaching the level of probe PH conduction will take place across the electrodes of that probe to activate amplifier A1 and cause it to energize relay AR1. Upon relay AR1 becoming energized its front contact a will close and energize the heating element of thermal relay T3. After a predetermined time interval the front contact a of relay T3 will close and hence establish an energizing circuit for relay PR which may be traced from terminal BX, over front contact a of relay T3 through the winding of relay PR and over front contact a of relay T4 to terminal NX. Hence, relay PR will pick up and close its front contacts a and b. The closing of front contact a will establish a stick circuit for relay PR which stick circuit may be traced from terminal BX, over front contact a of relay PR, through winding of relay PR and over front contact a of relay T4 to terminal NX. The closing of front contact b of relay PR will close the energizing circuit for motor M1 which circuit may be traced from terminal BX, through motor M1 and over front contact b relay PR to terminal NX. Hence, the pump motor will commence operating to operate the pump and commence removing water from the vessel V. The removal of water from the vessel V will be at a greater rate than the inflow of water from the pipe I. Hence, the level of the water will commence dropping. Upon the level of the water dropping below the probe PH current will cease to be supplied to the input of amplifier A1 and hence relay AR1 will become deenergized to deenergize relay T3. Upon relay T3 becoming deenergized its front contact $a$ will open and thus open the energizing circuit for relay PR. However, the relay PR will remain energized over its previously traced stick circuit and the pump motor M1 will hence continue to operate to cause the pump to continue lowering the level of the water.

Upon the water level being dropped below the probe PL current will cease to be supplied to the input of amplifier A2 and hence amplifier A2 will discontinue energizing relay AR2. With relay AR2 deenergized its front contact $a$ will open to thus deenergize relay T4 and cause is contact $a$ to open. With front contact $a$ of relay T4 open the stick circuit of relay PR will be opened to cause relay PR to become deenergized and release and thus deenergize pump motor M1 and pump Q1. This restores the circuit to its initially described condition.

The inclusion of the time delay relays T3 and T4 will prevent a chattering of the power relay PR and thus prevent serious pitting of its contacts and further prevent severe overloadings of the motor M1 during rapid chattering of power relay PR. By inclusion of the time delay means it will be assured that when the control contacts for relay PR are closed there is sufficient water in the area of the probes PH and PL to keep them closed for a substantial period of time.

Other types of liquid control means may be adapted from the fundamental idea described herein. The importance of the use of an electrical amplifying means to reduce the voltage requirements for a probe and the sensitivity of the repeater relay cannot be overestimated. Furthermore, the interposition between the liquid conducting means and the pump means of a time delay means substantially reduces the maintenance in the novel control system described herein. Lastly, the use of thermal relays will sharply reduce the cost of the initial installation.

Several advantages will flow from using constructions of the type described and suggested herein. For instance, in controlling a bilge pump the control apparatus may be located remote from the pump itself, and hence the need for hermetically sealed control apparatus is obviated. A large number of applications for the fundamental idea described and claimed herein come to mind. Among these are apparatus for controlling automatic irrigation systems, apparatus for controlling sump pumps, etc.

While I have herein shown and described several forms of the present invention and have suggested various changes and modifications therein other changes and modifications may be made therein within the scope of the appended claims without departing from the spirit and scope of this invention.

What I claim is:

1. Apparatus for controlling a motor driven pump for removing liquid from a vessel, comprising a pair of spaced electrodes the corresponding ends of which are adapted to be disposed in said vessel in contact with any liquid therein, means for providing a potential difference between said electrodes, current amplifying means having input terminals connected in series with said electrodes and having output terminals, an amplifier repeater relay, circuit means for connecting said output terminals of said amplifying means to said repeater relay for energizing said repeater relay when liquid engages said electrodes to conduct current therebetween, time delay means including a normally open contact which closes a predetermined time after said time delay means becomes energized, energizing circuit means for said time delay means including a front contact of said repeater relay, and circuit means for energizing said pump motor including said contact of said time delay means.

2. Apparatus for controlling a motor driven pump for removing liquid from a vessel in accordance with claim 1, wherein said contact of said time delay means operates from said open to said closed condition with relative rapidity.

3. Apparatus for controlling a motor driven pump for removing liquid from a vessel, comprising a pair of spaced electrodes the corresponding ends of which are adapted to be disposed in said vessel in contact with any liquid therein, means for providing a potential difference between said electrodes, current amplifying means having input terminals connected in series with said electrodes and having output terminals, an amplifier repeater relay, circuit means for connecting said output terminals of said amplifying means to said repeater relay for energizing said repeater relay when liquid engages said electrodes to conduct current therebetween, time delay means including a normally open contact which closes a predetermined time after said time delay means becomes energized, energizing circuit means for said time delay means including a front contact of said repeater relay, a power relay, circuit means for energizing said power relay including said contact of said time delay means, and circuit means for energizing said pump motor including a front contact of said power relay.

4. Apparatus for controlling a motor driven pump for removing liquid from a vessel in accordance with claim 3, wherein said time delay means includes cascade connected slow acting and quick acting thermal relays, a contact of said quick acting relay being said contact of said time delay means included in the energizing circuit for said power relay.

5. Means for maintaining the level of liquid in a vessel within predetermined lower and upper limits by a motor driven pump, comprising a lower pair of spaced electrodes disposed at said lower level, an upper pair of spaced electrodes disposed at said upper level, means for energizing each pair of electrodes, upper and lower circuit controlling means associated respectively with said upper and lower pairs of electrodes and responsive to current flow therebetween through said liquid, said upper and lower circuit controlling means each normally occupying a first circuit controlling condition and being operable to a second circuit controlling condition when current flows between their associated pair of electrodes, an upper and lower time delay means associated respectively with said upper and lower circuit controlling means, each of said time delay means having a contact normally occupying a first condition and being operable to a second condition a predetermined time interval after its associated circuit controlling means operates from said first to said second circuit controlling condition, and means controlled by said contacts of said two time delay means for controlling the energization of said pump motor.

6. Means for maintaining the level of liquid in a vessel within predetermined lower and upper limits by a motor driven pump said liquid being adapted to flow into said vessel through an inlet being removable by said pump, said level maintaining means comprising a lower pair of spaced electrodes disposed at said lower level, an upper pair of spaced electrodes disposed at said upper level, means for energizing each pair of electrodes, upper and lower circuit controlling means associated respectively with said upper and lower pairs of electrodes and responsive to current flow therebetween through liquid, said upper and lower circuit controlling means each having a first circuit controlling condition and being operable to a second circuit controlling condition when current flows between their associated pair of electrodes, an upper and lower time delay means associated respectively with said upper and lower circuit controlling means, each of said time delay means having a contact normally occupying a first condition and being operable to a second condition a predetermined time interval after its associated circuit controlling means operates from said first to said second circuit controlling condition, a power relay, an energizing circuit for said power relay including said contacts of said upper and lower time delay means and being closed when both of said contacts are in their second condition, a stick circuit for said power relay including said contact of said lower time delay means and closed when said contact is closed, and an energizing circuit for said pump motor including a front contact of said power relay.

References Cited in the file of this patent

UNITED STATES PATENTS

| | | |
|---|---|---|
| 1,346,898 | Kingsbury | July 20, 1920 |
| 1,820,981 | Le Fever | Sept. 1, 1931 |
| 2,147,422 | Bendz | Feb. 14, 1939 |
| 2,470,066 | Calabrese | May 10, 1949 |
| 2,785,270 | Burger | Mar. 12, 1957 |